Jan. 13, 1931.   E. G. K. ANDERSON   1,788,365
FLUID TIGHT COUPLING
Filed Sept. 25, 1926

Inventor:
E. G. K. Anderson,
By Wm. F. Freudenreich, Atty.

Patented Jan. 13, 1931

1,788,365

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

FLUID-TIGHT COUPLING

Application filed September 25, 1926. Serial No. 137,637.

The present invention has for its object to permit a threadless conduit to be coupled to another conduit or element in such a manner as to make between them a sealed joint through which fluids, even though under considerable pressure, are unable to pass.

Figure 1:
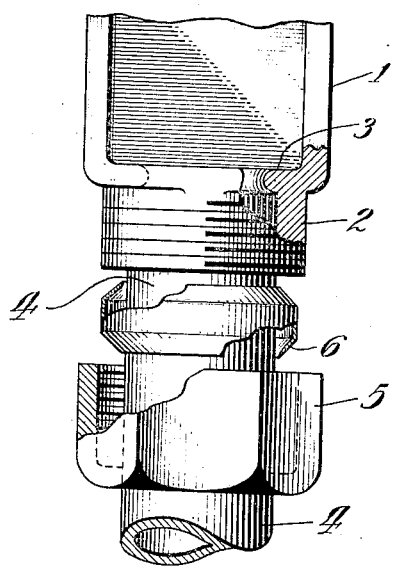
Figure 2:
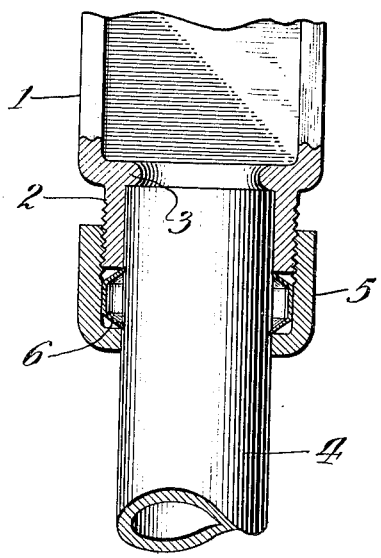
Figure 3:
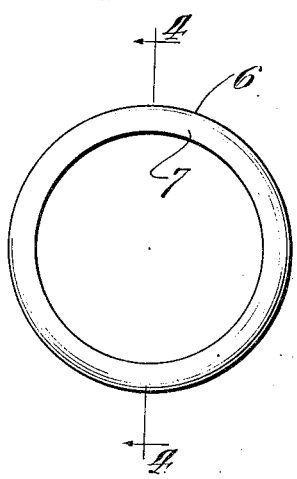
Figure 4:

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of a fragment of a connection box and a pipe or conduit in the act of being connected thereto, parts being broken away; Fig. 2 is a view partly in plan view and partly in transverse section, showing the various elements of Fig. 1 in their completely coupled relations; Fig. 3 is an end, on a larger scale than Figs. 1 and 2, of the sealing ring; Fig. 4 is a central transverse section through the sealing ring; and Fig. 5 is a view partly in section and partly in elevation, showing my improved coupling employed for connecting two pipes together.

Referring to Figs. 1 to 4, 1 represents a box having at one end a tubular neck 2 externally screw-threaded; the neck being provided with an internal shoulder 3 at its inner end. 4 is a pipe that extends into the member 2, preferably abutting against the shoulder 3 at its inner end. Screw-threaded upon the part 2 is a cup-shaped member 5 having in the bottom wall thereof a hole large enough to permit the pipe to pass through the same. Surrounding the pipe within the member 5 is a sealing ring 6. This ring is preferably made of comparatively thin steel pressed or otherwise formed to produce an annular trough whose bottom forms the periphery of the ring, while the sides 7 of the trough flare outwardly at an angle of about 45 degrees. The edges of the ring are preferably made very thin. The ring is so proportioned that it may be slipped easily upon the pipe and into the member 5. When the member 5 is screwed upon the neck 2, until the edges bounding the mouth of the trough in the ring are engaged respectively with the end of the member 2 and with the bottom of the cup, any further tightening of the cup-shaped nut results in a distortion of the ring. The ring is prevented from spreading radially by the surrounding nut, and therefore the sides of the trough must yield so as to become more nearly parallel. The result of the deflection of the sides of the trough is that the comparatively sharp edges around the mouth of the trough bite into the softer metal of the pipe along two separated lines extending entirely around the pipe. Furthermore, that side of the trough in contact with the end of the neck 2 seats itself tightly against the neck and there forms a seal. The pipe may be somewhat smaller in diameter than the internal diameter of the neck, in order to avoid the necessity of a machined fit so that the inner edge of the sealing ring tends to enter the space between the pipe and the surrounding neck and thus wedges itself tightly between the pipe and the neck while it is cutting into the metal of the pipe.

Not only is a fluid-tight seal produced by my improved coupling, but the sealing ring possesses sufficient mechanical strength to lock the pipe rigidly to the member 1 producing a joint that is strong mechanically.

Figure 5:
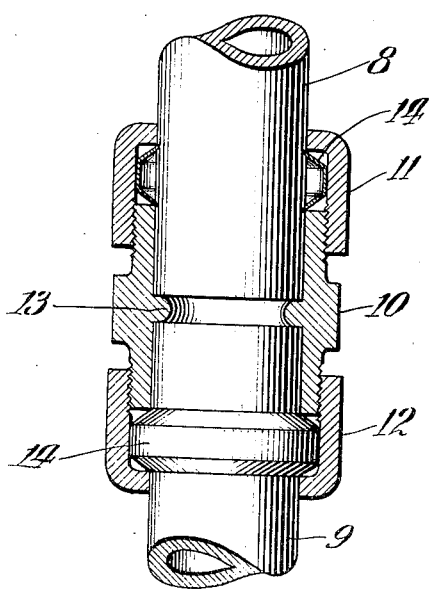

In Fig. 5 there are shown two pipes 8 and 9 connected together by a coupling comprising a sleeve 10 externally screw-threaded at the ends, together with two cup-shaped nuts 11 and 12 similar to the nut 5. The two pipes enter opposite ends of the sleeve and engage with a central internal rib 13 in the sleeve. Sealing rings 14, similar to the ring 6, are placed within the nuts 11 and 12 around the two pipes.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, an externally threaded tubular member, a pipe extending into said member, a ring of harder metal than the pipe surrounding the latter, said ring being in the form of a thin-walled trough having flaring sides extending inwardly from the periphery for engagement with the pipe, and a nut on said tubular member having a shoulder to engage with the outer side of the ring and press the ring against the end of said tubular member, the parts being so proportioned that the nut engages with the periphery of the ring to prevent expansion of the latter.

2. In combination, an externally threaded member, a pipe extending into the same, a ring of harder metal than the pipe in the form of a thin-walled trough having sides extending inwardly from the periphery, the sides of the trough being pressed into the metal of the pipe, and a nut on said tubular member engaged with the periphery of the ring and having a shoulder engaged with the outer side of the trough and pressing the inner side against the end of said tubular member.

In testimony whereof, I sign this specification.

ERNST G. K. ANDERSON.